(12) United States Patent
Xia et al.

(10) Patent No.: US 8,417,191 B2
(45) Date of Patent: Apr. 9, 2013

(54) METHOD AND SYSTEM FOR BEAMFORMING COMMUNICATION IN HIGH THROUGHPUT WIRELESS COMMUNICATION SYSTEMS

(75) Inventors: Pengfei Xia, Mountain View, CA (US); Huaning Niu, Sunnyvale, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1135 days.

(21) Appl. No.: 12/050,071

(22) Filed: Mar. 17, 2008

(65) Prior Publication Data
US 2009/0233556 A1 Sep. 17, 2009

(51) Int. Cl.
*H04B 1/00* (2006.01)
(52) U.S. Cl.
USPC .............. 455/69; 455/63.4; 455/68; 455/101; 455/137; 455/562.1; 375/299; 375/292; 375/267; 375/260; 375/141; 342/385; 342/368; 342/377; 342/372; 342/374
(58) Field of Classification Search .................. 455/63.4, 455/68, 101, 137, 562.1; 375/299, 292, 267, 375/260, 141, 340; 342/385, 368, 377, 372–374
See application file for complete search history.

(56) References Cited

U.S. PATENT DOCUMENTS

| 5,955,991 | A | 9/1999 | Kawakubo |
| 6,570,864 | B1 * | 5/2003 | Kim et al. ..................... 370/342 |
| 6,590,532 | B1 | 7/2003 | Ogawa et al. |
| 6,677,898 | B2 | 1/2004 | Cheng et al. |
| 6,731,689 | B2 | 5/2004 | Dogan |
| 6,795,392 | B1 | 9/2004 | Li et al. |
| 6,832,080 | B1 * | 12/2004 | Arslan et al. ................... 455/296 |
| 6,847,832 | B2 | 1/2005 | Wong et al. |
| 6,925,131 | B2 | 8/2005 | Balakrishnan et al. |
| 6,937,189 | B2 | 8/2005 | Kim |
| 6,959,047 | B1 | 10/2005 | Al-Dhahir et al. |
| 7,013,165 | B2 * | 3/2006 | Yoon et al. ..................... 455/561 |
| 7,039,370 | B2 | 5/2006 | Laroia et al. |
| 7,161,534 | B2 | 1/2007 | Tsai et al. |
| 7,239,893 | B2 | 7/2007 | Yang |
| 7,312,750 | B2 | 12/2007 | Mao et al. |
| 7,342,535 | B2 | 3/2008 | Ann et al. |

(Continued)

FOREIGN PATENT DOCUMENTS

JP 2004140642 5/2004

OTHER PUBLICATIONS

U.S. Notice of Allowance for U.S. Appl. No. 11/881,978 mailed Oct. 28, 2010.

(Continued)

*Primary Examiner* — Edward Urban
*Assistant Examiner* — Ganiyu A Hanidu
(74) *Attorney, Agent, or Firm* — Kenneth L. Sherman, Esq.; Michael Zarrabian, Esq.; Sherman & Zarrabian LLP

(57) ABSTRACT

A method and system for beamforming communication in high throughput wireless communications. Analog beamforming involves constructing analog beamforming coefficients for beamforming communication on a wireless channel. Constructing analog beamforming coefficients includes selecting a signal tap from a multi-tap wireless channel for beamforming communication, wherein the selected signal tap has a higher signal quality relative to other signals taps, and determining beamforming coefficients for the selected tap by iterative acquisition of the coefficients based on power iteration.

33 Claims, 9 Drawing Sheets

U.S. PATENT DOCUMENTS

| | | | |
|---|---|---|---|
| 7,450,659 | B2 | 11/2008 | Corredoura et al. |
| 7,668,255 | B1 | 2/2010 | Al-Dhahir et al. |
| 7,697,602 | B2 | 4/2010 | Frey et al. |
| 7,702,028 | B2 | 4/2010 | Zhou et al. |
| 7,710,319 | B2 | 5/2010 | Nassiri-Toussi et al. |
| 7,711,330 | B2 | 5/2010 | Yang et al. |
| 7,714,783 | B2 | 5/2010 | Niu et al. |
| 7,801,238 | B2 * | 9/2010 | Borst et al. ............. 375/267 |
| 7,826,559 | B2 | 11/2010 | Al-Dhahir et al. |
| 7,881,396 | B2 | 2/2011 | Zhou et al. |
| 2004/0127168 | A1 * | 7/2004 | Ito ............. 455/82 |
| 2004/0242156 | A1 * | 12/2004 | Tiirola et al. ............. 455/25 |
| 2004/0242162 | A1 * | 12/2004 | Lau ............. 455/69 |
| 2004/0247038 | A1 * | 12/2004 | Uesugi et al. ............. 375/260 |
| 2005/0276347 | A1 | 12/2005 | Mujtaba et al. |
| 2006/0030364 | A1 * | 2/2006 | Olesen et al. ............. 455/562.1 |
| 2006/0104382 | A1 * | 5/2006 | Yang et al. ............. 375/267 |
| 2006/0234645 | A1 | 10/2006 | Lin et al. |
| 2006/0248429 | A1 | 11/2006 | Grandhi et al. |
| 2007/0189412 | A1 | 8/2007 | Xia et al. |
| 2008/0101493 | A1 | 5/2008 | Niu et al. |
| 2008/0108390 | A1 | 5/2008 | Yoon et al. |
| 2008/0134254 | A1 | 6/2008 | Xia et al. |
| 2008/0144751 | A1 | 6/2008 | Xia et al. |
| 2008/0204319 | A1 * | 8/2008 | Niu et al. ............. 342/368 |
| 2009/0058724 | A1 | 3/2009 | Xia et al. ............. 342/377 |
| 2009/0121935 | A1 | 5/2009 | Xia et al. |
| 2011/0237196 | A1 | 9/2011 | Niu et al. |

OTHER PUBLICATIONS

Van Veen, B.; and Buckley, K., "Beamforming: A Versatile Approach to Spatial Filtering," IEEE ASSP Magazine, vol. 5, pp. 4-24, Apr. 1988.

Butler, J. et al., "Beam-Forming Matrix Simplifies Design of Electronically Scanned Antennas," Electronic Design, Apr. 12, 1961, pp. 170-173, United States.

Stuber, G. et al., "Broadband MIMO-OFDM Wireless Communications," Proceedings of the IEEE, vol. 92 No. 2, pp. 271-294, Feb. 2004, United States.

Hitachi, LTD. et al., "High-Definition Multimedia Interface Specification Version 1.2," Aug. 22, 2005, pp. ii-214, United States.

IEEE Std 802.15.3—2003 "802.15.3 IEEE Standard for Information Technology—Telecommunications and Information Exchange Between Systems—Local and Metropolitan Area Networks—Specific Requirements, Part 15.3: Wireless Medium Access Control (MAC) and Physical Layer (PHY) Specifications for High Rate Wireless Personal Area Networks (WPANs)," LAN/MAN Standards Committee, IEEE Computer Society, Sep. 29, 2003, pp. 1-324, United States.

Hansen, R.C., Phased Array Antennas, Wiley Series in Microwave and Optical Engineering, John Wiley & Sons, Inc., 1998, pp. 1-486, New York, United States.

Coffey, S. et al., "Joint Proposal: High Throughput Extension to the 802.11 Standard: PHY" IEEE 802.11-05/1102r4, Jan. 13, 2006, pp. 1-82, United States.

Niu, H. et al., "Beamforming for Space-Time Coded IEEE 802.11n System with Known Fading Correlations," Proceedings of 39th Asilomar Conference on Signals, Systems and Computers, Pacific Grove, CA, Nov. 2005, IEEE, 2005, pp. 1014-1018, United States.

De Los Santos, H.J., "MEMS-Based Microwave Circuits and Systems," Introduction to Microelectromechanical (MEM) Microwave Systems, Artech House, pp. 167-168 and 193, 1999, Boston, United States.

Furrer, S. et al., "Bounds on the Ergodic Capacity of Training-Based Multiple-Antenna Systems," Internal Symposium on Information Theory, 2005, IEEE, Sep. 2005, pp. 780-784, United States.

IEEE P802.11n/D1.0, "Draft Amendment to Standard for Information Technology—Telecommunications and Information Exchange Between Systems—Local and Metropolitan Networks—Specific requirements—Part 11: Wireless LAN Medium Access Control (MAC) and Physical Layer (PHY) Specifications: Enhancements for Higher Throughput," 802.11 Working Group of the 802 Committee, Mar. 2006, pp. i-328, United States.

Scintera Networks, "Advanced Signal Processing Platform," Sep. 2003, pp. 1-9, United States.

Razavi, B., "Challenges in Portable RF Transceiver Design." Circuits & Devices, IEEE, Sep. 1996, pp. 12-25, United States.

Buzzi, S. et al., "Performance of Iterative Data Detection and Channel Estimation for Single-Antenna and Multiple-Antennas Wireless Communications," IEEE Transactions on Vehicular Technology, vol. 53, No. 4, Jul. 2004, pp. 1085-1104, United States.

Wireless HD, LLC, "WirelessHD Specification Draft Version 0.7," WirelessHD Consortium, Feb. 2007, pp. 1-8, United States.

U.S. Non-Final Office Action for U.S. Appl. No. 11/706,942 mailed Oct. 15, 2009.

U.S. Non-Final Office Action for U.S. Appl. No. 11/890,207 mailed Jun. 23, 2008.

U.S. Final Office Action for U.S. Appl. No. 11/890,207 mailed Nov. 24, 2008.

U.S. Advisory Action for U.S. Appl. No. 11/890,207 mailed Mar. 2, 2009.

U.S. Final Office Action for U.S. Appl. No. 11/890,207 mailed Oct. 26, 2009.

U.S. Non-Final Office Action for U.S. Appl. No. 11/890,207 mailed Apr. 6, 2009.

U.S. Notice of Allowance for U.S. Appl. No. 11/890,207 mailed Jan. 11, 2010.

U.S. Non-Final Office Action for U.S. Appl. No. 11/899,286 mailed Sep. 24, 2009.

U.S. Notice of Allowance for U.S. Appl. No. 11/899,286 mailed Jan. 21, 2010.

U.S. Non-Final Office Action for U.S. Appl. No. 11/881,978 mailed Jul. 25, 2008.

U.S. Non-Final Office Action for U.S. Appl. No. 11/881,978 mailed Jan. 2, 2009.

U.S. Non-Final Office Action for U.S. Appl. No. 11/881,978 mailed May 20, 2010.

U.S. Notice of Allowance for U.S. Appl. No. 11/881,978 mailed Sep. 15, 2009.

U.S. Non-Final Office Action for U.S. Appl. No. 12/189,726 mailed Dec. 13, 2011.

* cited by examiner

METHOD AND SYSTEM FOR BEAMFORMING COMMUNICATION IN HIGH THROUGHPUT WIRELESS COMMUNICATION SYSTEMS

FIELD OF THE INVENTION

The present invention relates to wireless communications and in particular to beamforming in wireless communication systems.

BACKGROUND OF THE INVENTION

In wireless communication systems including transmitters and receivers, antenna array beamforming provides increased signal quality (high directional antenna beamforming gain) and an extended communication range by steering the transmitted signal in a narrow direction. For this reason, such beamforming has been widely adopted in radar, sonar and other communication systems.

The beamforming operation can be implemented either in the analog domain (i.e., before an analog-to-digital (A/D or ADC) converter at the receiver and after a digital-to-analog (D/A or DAC) converter at the transmitter), or in the digital domain (i.e., after the A/D converter at the receiver and before the D/A converter at the transmitter).

In conventional multiple-input multiple-output (MIMO) orthogonal frequency division multiplexing (OFDM) wireless systems, transmit and/or receive beamforming is implemented in the digital domain. Specifically, in such systems, digital beamforming is implemented before an inverse Fast Fourier Transform (IFFT) operation at the transmitter, and after a FFT operation at the receiver.

Though digital beamforming improves performance, such improvement is at the cost of N radio frequency (RF) chains and N IFFT/FFT operations, wherein N is the number of antennas. For digital beamformed MIMO OFDM systems, beamforming vectors are obtained separately for each and every subcarrier, which generally involves a decomposition operation on each subcarrier. Further, singular value decomposition, or eigenvalue decomposition is normally needed. The complexity of such operations further increases as sampling frequency increases.

BRIEF SUMMARY OF THE INVENTION

The present invention provides a method and system for beamforming communication in high throughput wireless communications. One embodiment involves analog beamforming in a wireless communication system, by constructing analog beamforming coefficients for beamforming communication on wireless channels, including selecting a signal tap from a multi-tap wireless channel for beamforming communication, wherein the selected signal tap has a higher signal quality relative to other signals taps, and determining beamforming coefficients for the selected tap by iterative acquisition of the coefficients based on power iteration.

The iterative acquisition of beamforming coefficients (vectors) may utilize one channel matrix on the best signal path. The selected signal tap has a higher signal quality relative to other taps, can be determined by computing a Frobenius norm for all channel taps, and then selecting a tap with the largest Frobenius norm as the selected signal tap. It is advantageous to beamform on the best signal tap instead of across all taps as this reduces complexity in calculating beamforming vectors.

These and other features, aspects and advantages of the present invention will become understood with reference to the following description, appended claims and accompanying figures.

DETAILED DESCRIPTION OF THE INVENTION

Figure 1:
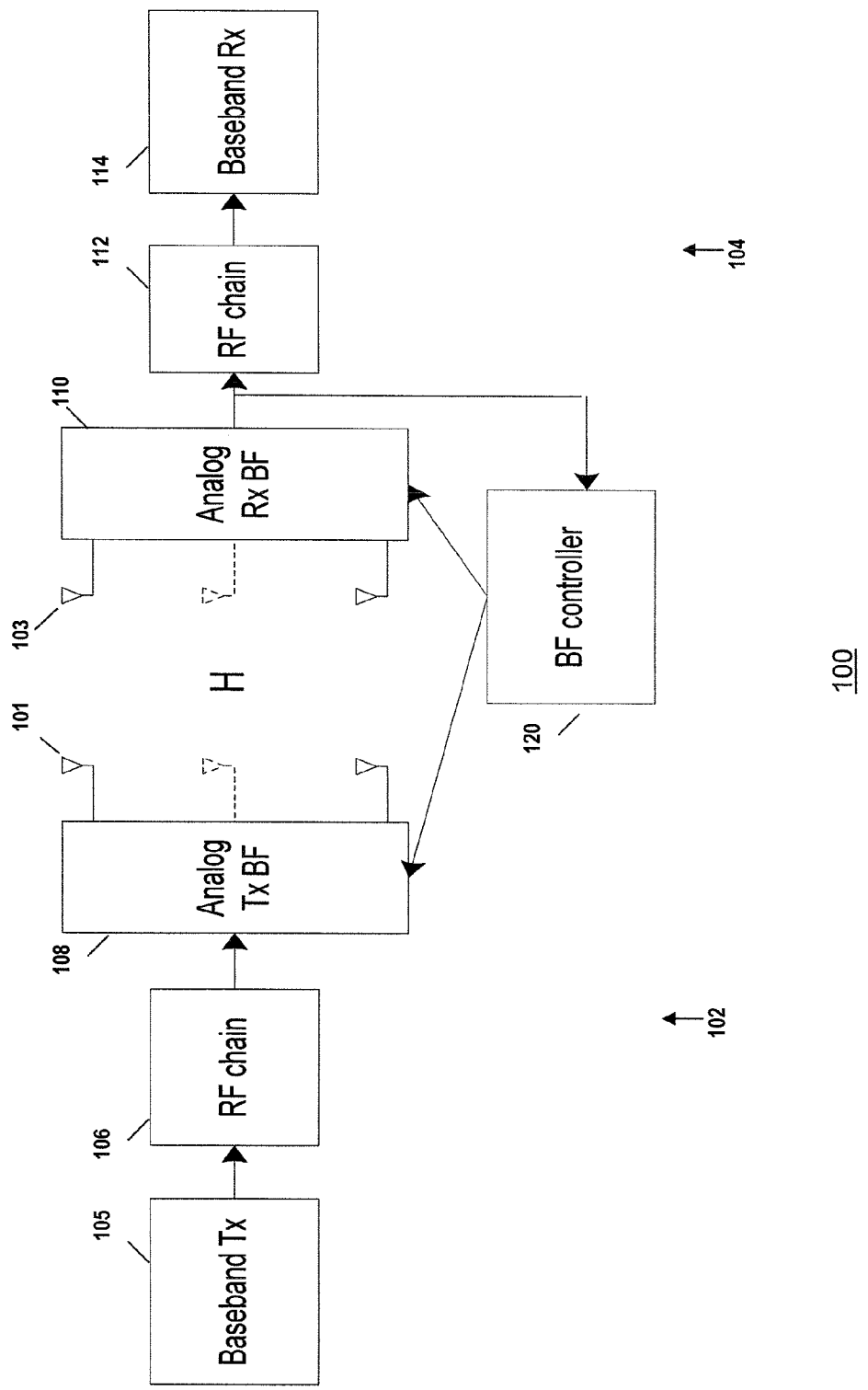
FIG. 1 shows a functional block diagram of a wireless communication system according to an embodiment of the invention.

The present invention provides a method and system for beamforming communication in high throughput wireless communications. One embodiment involves implementing an efficient transmit and receive analog beamforming protocol for very high throughput wireless communications, such as IEEE 802.15.3c and ECMA standards on millimeter wave (mm-wave) communication networks (ECMA international organization ECMA-60 GHz wireless protocol), and implementation of Wireless HD standard on uncompressed video trasmission. WirelessHD is an industry-led effort to define a wireless digital network interface specification for wireless HD digital signal transmission on the 60 GHz frequency band, e.g., for consumer electronics (CE) and other electronic products. An example WirelessHD network utilizes a 60 GHz-band mm-wave technology to support a physical (PHY) layer data transmission rate of multi-Gbps (gigabits per second), and can be used for transmitting uncompressed high definition television (HDTV) signals wirelessly. The present invention is useful with other wireless communication systems as well.

To enable high throughput wireless links between a wireless transmitter and a wireless receiver over wireless channels, essentially optimal transmit and receive analog beamforming vectors (beamforming coefficients) should be acquired in advance. A process for acquiring such analog beamforming vectors using power iteration according to the present invention is provided, involving iterative acquisition of the beamforming vectors based on power iteration. As a result, singular value decomposition (SVD) is not required, though may be used. Such power iteration is applicable for both TDD (time division duplex) and FDD (frequency division duplex) wireless communication systems. The process for acquiring such beamforming vectors is useful with an increasing number of antennas in the communication system.

Iterative acquisition of analog beamforming (steering) vectors by power iteration selects the strongest signal power path (i.e., best signal tap or best signal quality tap) in a multipath (multi-tap) wireless channel, without requiring a search for optimum steering vector across the multipath channel. Such iterative acquisition of beamforming (steering) vectors utilizes one channel matrix on the best signal path. The best signal tap, the tap with a higher signal quality relative to other taps, can be determined by, e.g., computing a performance metric such as a Frobenius norm for all channel taps, and then selecting a tap with the largest Frobenius norm as the best signal tap. It is advantageous to beamform on the best signal tap instead of across all taps as this reduces complexity in calculating beamforming vectors.

As such, an implementation of the iterative acquisition of analog beamforming vectors by power iteration for a wireless communication system using mm-wave frequency band and antenna array beamforming, is described below, according to an embodiment of the invention.

MIMO Multi-Tap Channel and System Model

FIG. 1 shows a functional block diagram of a wireless communication system 100 with multiple (Nt) transmit antennas 101 of a transmitter Tx module 102, and multiple (Nr) receive antennas 103 of a receiver Rx module 104. The system 100 implements analog beamforming (BF) by iterative acquisition of analog beamforming vectors using power iteration, according to the present invention.

The Tx module 102 includes a baseband transmitter Tx 105, a radio frequency (RF) chain 106 and an analog transmit beamforming (analog Tx BF) module 108. The Rx module 104 includes an analog receive beamforming (analog Rx BF) module 110, an RF chain 112 and a baseband receiver Rx 114.

In operation, the baseband Tx 105 generates digital baseband signals as routine, wherein the signals are fed through the RF chain 106 for conversion to analog by a digital-to-analog function of the RF chain 106 and modulation using a high frequency carrier. The modulated analog signal from the RF chain 106 is beamformed by the Tx BF 108 and transmitted via a wireless channel H through multiple transmit antenna elements 101. Tx beamforming 108 involves multiplying the input signal by a number of different Tx coefficients and routing the corresponding products to the same number of antenna elements 102, with one coefficient corresponding to one antenna element 101.

The transmitted signals propagate through the channel H, and are received by the receive antenna elements 103. The received signals on multiple receive antenna elements are combined by the Rx BF 110 into a single combined signal. Rx BF collects multiple received signals from multiple antenna elements 103, multiplying each signal by a different Rx coefficient and sums the products. The combined signal is converted to digital format by an analog-to-digital conversion function of the RF chain 112. Specifically, the RF chain 112 receives an analog signal from the air, demodulates it from the high frequency carrier, and converts it to a digital signal for further processing. The digital signal is processed by the baseband Rx 114 where final information is extracted as routine.

The Tx BF 108 and the Rx BF 110 are controlled by a control signal representing a group of coefficients, a Tx BF vector and a Rx BF vector, respectively, wherein the control signal is provided by a BF controller 120. The BF controller 120 implements joint iterative acquisition of analog beamforming vectors using power iteration.

The wireless channel H between any transmit/receive antenna pair is a multipath fading channel which can be modeled as a finite impulse response (FIR) filter. Such a wireless channel can be modeled as:

$$H(0)\delta(n)+H(1)\delta(n-1)+H(2)\delta(n-2)+ \ldots +H(L)\delta(n-L),$$

wherein L+1 is the maximum number of taps for all transmit/receive antenna pairs, H(i), i=0, . . . , L, represents the channel matrix (of size Nr-by-Nt), corresponding to tap i, and $\delta(n)$ is the Kronecker delta function.

Figure 2:
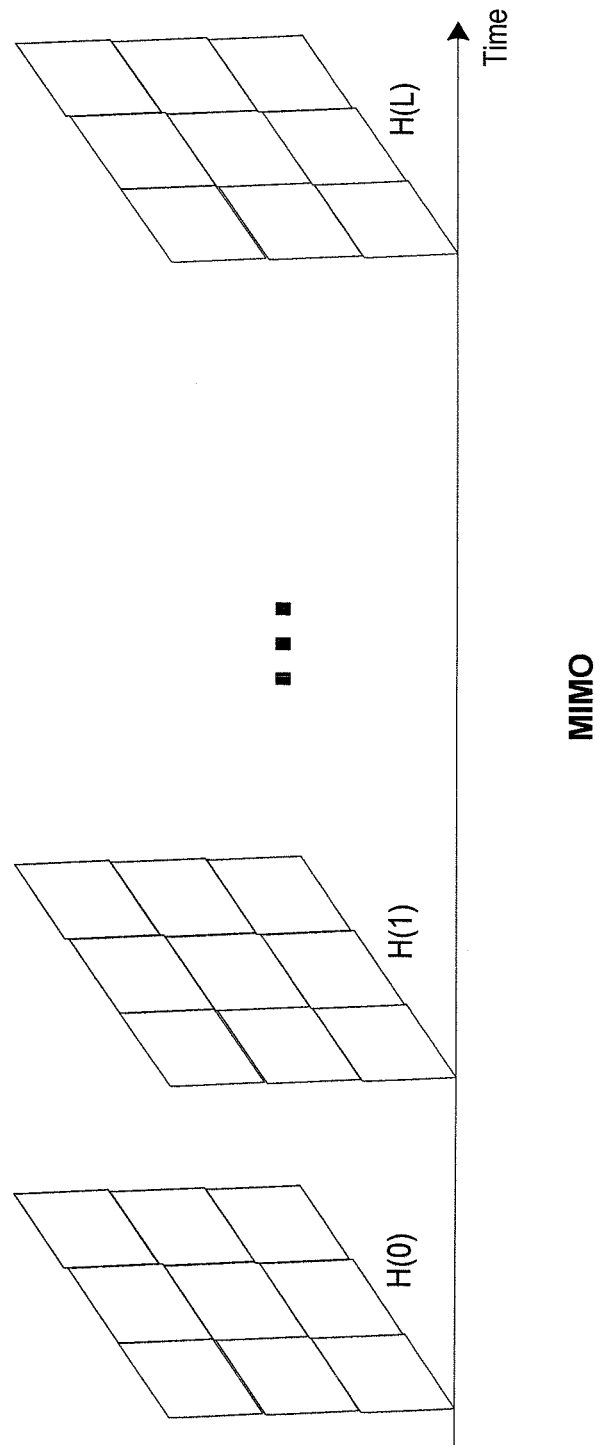
FIG. 2 illustrates a MIMO multi-tap channel in the time domain.
Figure 3:
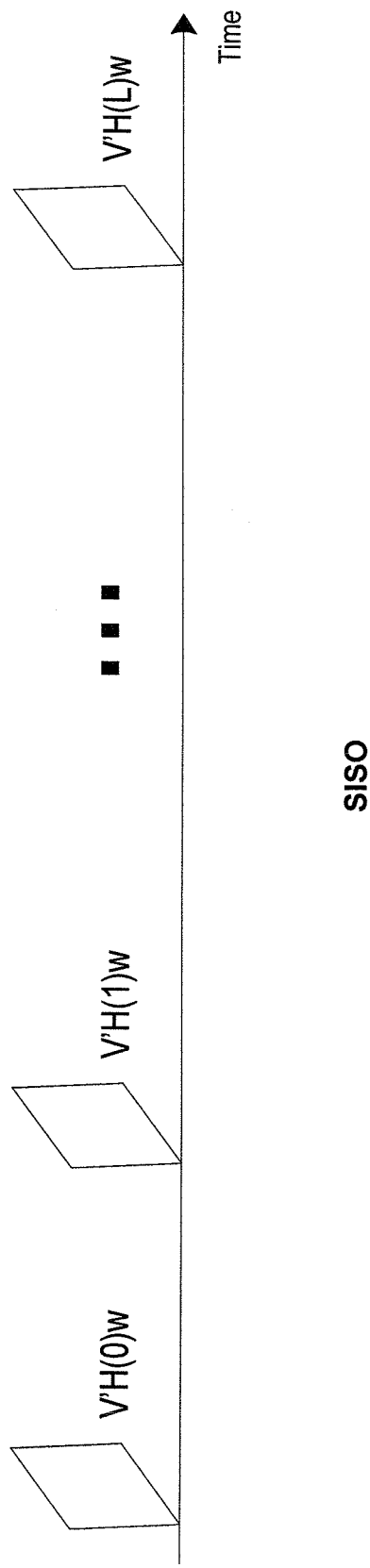
FIG. 3 illustrates an equivalent single-input-single-output (SISO) multi-tap channel after joint transmit-receive beamforming.

FIG. 2 illustrates such a multiple-input-multiple-output (MIMO) multi-tap channel H in the time domain. For certain communication applications, transmit beamforming and receive beamforming, jointly, are adopted as the enabling method toward high reliability and high throughput. Such applications include high rate data and video communications in the mm-wave frequency band mentioned further above. Let w=[w(1) w(2) . . . w(Nt)] be the transmit beamforming vector and v=[v(1)v(2) . . . v(Nr)] be the receive beamforming vector. From a system design view, it is desirable to jointly determine w and v in the BF controller 120, in order to optimize the system operating signal-to-noise-ratio (SNR) which determines the communication error rate performance. After transmit and receive beamforming jointly, the overall equivalent channel in the time domain can be expressed as:

$$v'H(0)w\ \delta(n)+v'\ H(1)w\delta(n-1)+v'H(2)w\ \delta(n-2)+ \ldots +v'\ H(L)w\ \delta(n-L),$$

wherein v'H(i)w is a scalar that represents an equivalent single-input-single-output (SISO) channel for the ith channel tap, i=0, . . . , L. FIG. 3 illustrates such equivalent SISO multi-tap channel in the time domain after joint transmit-receive beamforming.

The beamforming vectors are determined using only one channel matrix on the best signal tap representing the strongest signal power path (i.e., best signal quality tap) in a multipath (multi-tap) wireless channel. In doing so, only one channel matrix H(x) out of altogether L+1 channel matrices is involved. This may reduce computation complexity and the signaling overhead in determining beamforming vectors. Further, for sparse channels, as numerical results verify, it is often advantageous to beamform on the best signal tap only, instead of across all taps regardless of their importance.

Beamforming Acquisition Protocol

The beamforming acquisition process according to the present invention involves finding (selecting) the best signal tap for carrying on the beamforming process, and finding the best beamforming vectors w and v for that best signal tap.

Finding the Best Signal Tap

Figure 4:
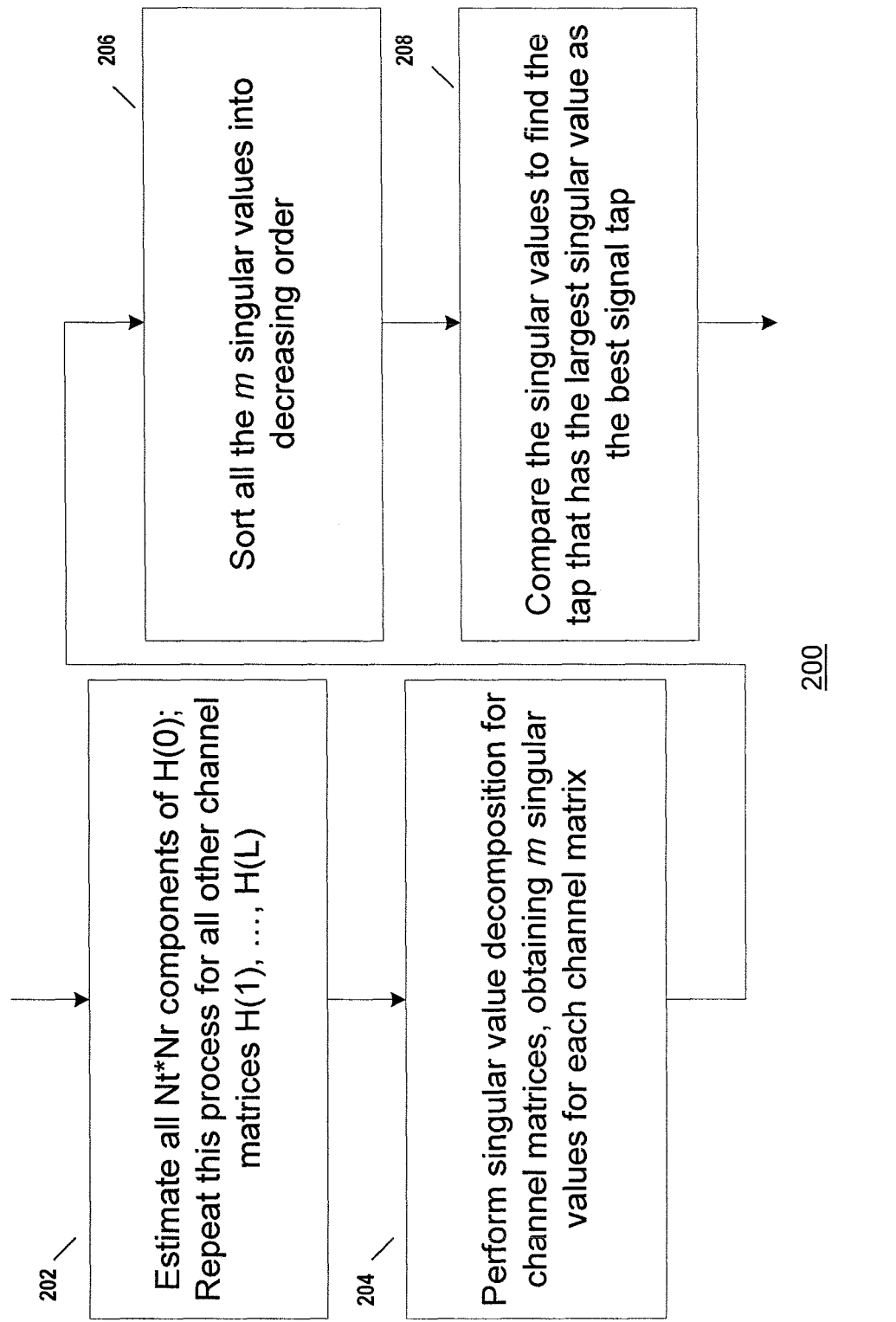
FIG. 4 illustrates a process for determining the best signal tap.

The best signal tap can be determined in different ways. FIG. 4 shows an example process 200 for determining the best signal tap, which involves:

Step 202: Estimating $\{H(0), H(1), \ldots, H(L)\}$, component by component. Specifically, estimate all Nt*Nr components of H(0); repeat this process for all other channel matrices H(1), . . . , H(L).

Step 204: Performing singular value composition for each channel matrix. Specifically, perform singular value decomposition for H(0), obtaining m singular values of H(0) as $S1(0)>=S2(0), \ldots, >=Sm(0)$, ordered decreasingly, where m=min(Nt, Nr). Repeat this process for all other channel matrices H(1), . . . , H(L), obtaining m singular values for each channel matrix.

Step 206: Sort all singular values in decreasing order:
Singular values of H(0): S1(0), S2(0), . . . , Sm(0),
Singular values of H(1): S1(1), S2(1), . . . , Sm(1),
Singular values of H(L): S1(L), S2(L), . . . , Sm(L).

Step 208: Compare the largest singular value (LSV) for different taps (each tap has min(Nt, Nr) singular values), wherein the one tap that has the largest singular value can be selected as the best signal tap. Specifically, compare S1(0), S1(1), ... S1(L), wherein the tap x such that has the largest S1(x) is the best signal tap.

Such a process 200 involves estimating altogether Nt*Nr*(L+1) channel coefficients performing and L+1 singular value decompositions to find the best signal tap.

Examples of determining the best transmit and receive beamforming vectors for a best signal tap, are now described.

Power Iterations Protocol in a TDD System

Using the best signal tap, the best transmit and receive beamforming vectors can be acquired using a power iterations protocol for a TDD wireless communication system, according to the present invention. Without loss of generally, it is assumed that the $0^{th}$ tap is the best signal tap (dropping the tap index and assuming the channel matrix on the best tap is H). Given the channel matrix H, a direct method to find joint optimal transmit and receive beamforming vectors utilizes singular value decomposition (SVD). Basically, an arbitrary matrix H of size Nr-by-Nt has a SVD as H=V S W', wherein V=[v(1), v(2), ..., vNr)] as the left singular matrix which is unitary, W=[w(1), w(2), ..., w(Nt)] as the right singular matrix which is also unitary, and S=diag(s(1), s(2), ..., s(m)] of size Nr*Nt, as a diagonal matrix with all off-diagonal values zero. After the SVD operation, w(1) and v(1) are selected as the best transmit beamforming vector and receive beamforming vector, respectively.

Given the above assumptions, since only w(1), v(1) are needed, the process can be simplified as follows. For the above SVD, the channel matrix can also be written as H=s(1)v(1)w(1)'+s(2)v(2)w(2)'+...+s(m)v(m)w(m)', where s(1)>s(2)>...>s(m). As such:

$$HH' = s(1)s(1)\underline{v}(1)\underline{w}(1)'\underline{w}(1)\underline{v}(1)' + s(2)s(2)\underline{v}(2)\underline{w}(2)'\underline{w}(2)\underline{v}(2)' + ... + s(m)s(m)\underline{v}(m)\underline{w}(m)'\underline{w}(m)\underline{v}(m)'$$
$$= s(1)^{\wedge}2\underline{v}(1)\underline{w}(1)'\underline{w}(1)\underline{v}(1)' + s(2)^{\wedge}2\underline{v}(2)\underline{w}(2)'\underline{w}(2)\underline{v}(2)' + ... + s(m)^{\wedge}2\underline{v}(m)\underline{w}(m)'\underline{w}(m)\underline{v}(m)'$$

and $$H'H = s(1)^{\wedge}2\underline{w}(1)\underline{v}(1)'\underline{v}(1)\underline{w}(1)' + s(2)^{\wedge}2\underline{w}(2)\underline{v}(2)'\underline{v}(2)\underline{w}(2)' + ... + s(m)^{\wedge}2\underline{w}(m)\underline{v}(m)'\underline{v}(m)\underline{w}(m)'.$$

continuing multiplication HH', in general for n pairs of HH' multiplied together:

$$HH'*HH'* ... *HH' = s(1)^{\wedge}(2n)v(1)w(1)'v(1)'+s(2)^{\wedge}(2n)v(2)w(2)'v(2)'+...+s(m)^{\wedge}(2n)v(m)w(m)'w(m)v(m)'.$$

Similarly, for n pairs of H'H multiplied together:

$$H'H*H'H* ... * H'H = s(1)^{\wedge}(2n)w(1)v(1)'v(1)w(1)'+s(2)^{\wedge}(2n)w(2)v(2)'v(2)w(2)'+...+s(m)^{\wedge}(2n)w(m)v(m)'v(m)w(m)'.$$

Observing that as n increases, then:

$$\lim_{n\to\infty} \frac{s(2)^{2n}}{s(1)^{2n}} = 0, \ldots, \lim_{n\to\infty} \frac{s(m)^{2n}}{s(1)^{2n}} = 0,$$

which is due to the fact that s(1)>s(2)>...>s(m).

In other words, as HH' are multiplied together (or H'H is multiplied together), the contributions of the largest singular value s(1) and the corresponding singular vectors w(1), v(1), become more pronounced and in the limit, all other singular values, s(2), ..., s(m), and the corresponding vectors w(2), ..., w(m), v(2), ..., v(n), play minimal roles toward the final product. An example is provided below. Let H be a 4*4 matrix with randomly generated coefficients for each channel component. The ratios between the powers of s(2) and powers of s(1) are given below for several values of n, as:

$$n = 1, \frac{s(2)^{2n}}{s(1)^{2n}} = 0.3088, \frac{s(3)^{2n}}{s(1)^{2n}} = 0.1066, \frac{s(4)^{2n}}{s(1)^{2n}} = 0.0368,$$

$$n = 2, \frac{s(2)^{2n}}{s(1)^{2n}} = 0.0954, \frac{s(3)^{2n}}{s(1)^{2n}} = 0.0114, \frac{s(4)^{2n}}{s(1)^{2n}} = 0.0014,$$

$$n = 3, \frac{s(2)^{2n}}{s(1)^{2n}} = 0.0295, \frac{s(3)^{2n}}{s(1)^{2n}} = 0.0012, \frac{s(4)^{2n}}{s(1)^{2n}} = 0.0000,$$

$$n = 4, \frac{s(2)^{2n}}{s(1)^{2n}} = 0.0091, \frac{s(3)^{2n}}{s(1)^{2n}} = 0.0001, \frac{s(4)^{2n}}{s(1)^{2n}} = 0.0000,$$

$$n = 5, \frac{s(2)^{2n}}{s(1)^{2n}} = 0.0028, \frac{s(3)^{2n}}{s(1)^{2n}} = 0.0000, \frac{s(4)^{2n}}{s(1)^{2n}} = 0.0000,$$

As can be seen, the ratios decrease to zero quickly as the power multiplication proceeds. The power iteration is so termed because each iteration involves taking HH' to the power of n, where n is the iteration index and each iteration brings one more degree of power to the product. Taking advantage of such a result, the power iteration process according to the present invention can successfully estimate the best transmit and receive beamforming vectors iteratively, without requiring SVD computations.

Figure 5:
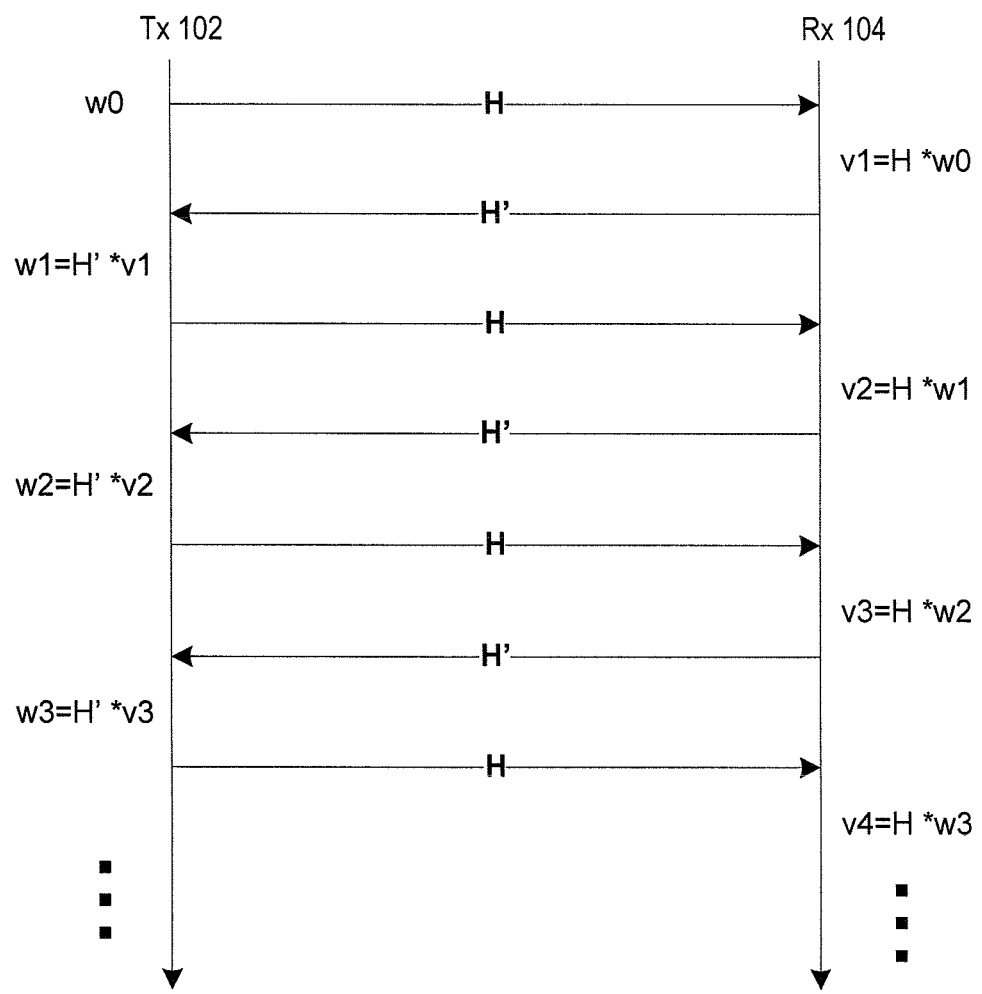
FIG. 5 shows a beam acquisition process for a Time Division Duplex (TDD) wireless communication system, according to an embodiment of the invention.

FIG. 5 illustrates a protocol scenario 300 for a power iteration process according to an embodiment of the invention, progressing from top to bottom of the drawing, for acquisition of the beamforming vectors based on channel reciprocity. Such a scenario is useful with TDD communication systems where channel calibration is already performed. The protocol estimates transmit beamforming vector in the reverse direction with no explicit feedback. The training direction is forward-reverse-forward-reverse, etc. The power iteration process involves first fixing the transmit beamforming vector to a certain arbitrary vector w0. Then, sending out w0 from the transmitter side 102 (FIG. 1), the received vector at the receiver side 104 can then be used to estimate the best receive beamforming vector v1. The best receive beamforming vector v1 can then be sent from the receiver side to the transmitter side. Assuming channel reciprocity, the received vector at the transmitter side is then used to estimate/refresh the best transmit beamforming vector. This process is repeated until the iteration converges. Example computations for estimating the transmit and receive beamforming vectors in FIG. 5 (for TDD systems) are provided further below.

Figure 6:
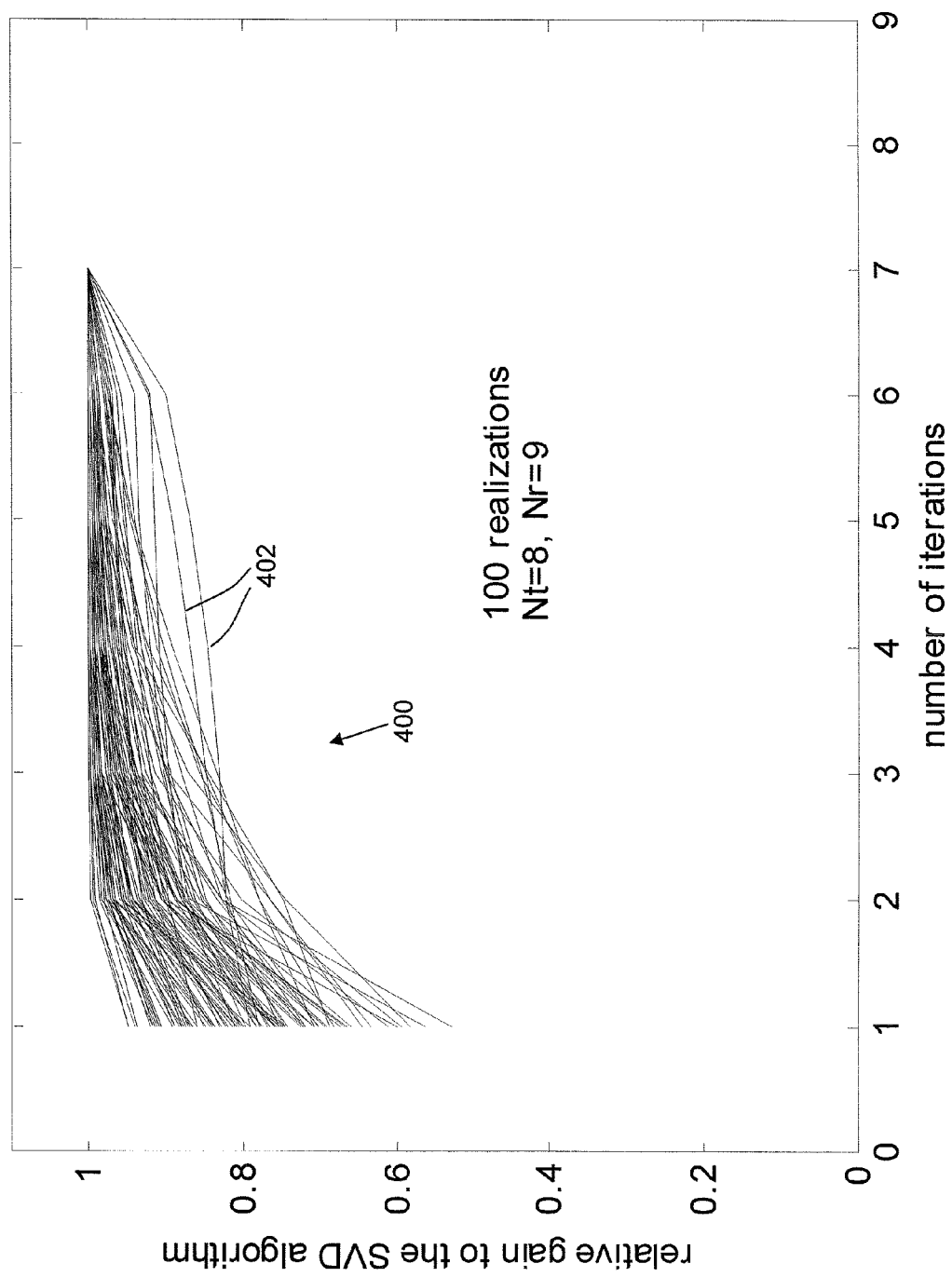
FIG. 6 illustrates an example of convergence behavior of the power iteration process in FIG. 5.

FIG. 6 shows an example of convergence behavior 400 of the above power iteration process for 100 realizations, depicted in terms of number of iterations relative to gain to a process utilizing SVD computation. FIG. 6 provides a numerical evaluation of an example iterative protocol according to the invention, where the convergence behavior is of interest. Each graph 402 corresponds to one realization and the realization converges, which demonstrates that the iterative protocol provides desirable results.

Power Iteration Protocol in a FDD System

Using the best signal tap, the best transmit and receive beamforming vectors can be acquired using a power iterations protocol for a FDD wireless communication system, according to the present invention. Let v be the optimal receive beamforming vector and w be the optimal transmit beamforming vector. The gain G of the equivalent SISO channel can be expressed as: $G=|v'^{*}H^{*}w|$.

Selecting v0 as the initial receive beamforming vector and w0 as the initial transmit beamforming vector, the following process provides an optimal solution of v and w in a power iterative manner, as:

1. Fix v0. Treat the composite channel (v0'*H) as an equivalent multiple-input-single-output (MISO) channel. Find the best beamforming vector w1 such that gain $G01=|v0'^{*}H^{*}w1|$ is maximized.
2. Fix w1. Treat the composite channel (H*w) as an equivalent single-input-multiple-output (SIMO) channel. Find the best beamforming vector v1 such that gain $G11=|v1'^{*}H^{*}w1|$ is maximized.
3. Repeat step 1 and step 2, alternatively, until the achieved gain converges.

The achieved gain cannot exceed $G=|v'^{*}H^{*}w|$, since it is the overall optimal solution. The achieved gain is optimized and cannot decrease. Thus, $G01 \leq G11 < G12 \leq G22 \leq G23 \leq G33 \leq \ldots$.

Since the achieved gain always increases and since the achieved gain cannot exceed G, then after a limited number of iterations, the iteration will converge. The number of iterations required is limited.

Estimation of the transmit and receive beamforming vectors can also be performed all at the receiver side. Estimation of the transmit beamforming vector is farther fed back to the transmitter through a back channel.

1. Fix the transmit beamforming vector to a certain arbitrary vector w0.
2. Send out w0 from the transmitter side 102 to the receiver side 104.
3. Use the received vector at the receiver side to estimate the best receive beamforming vector v1.
4. Send out v1 from the receiver side to the transmitter side.
5. Upon receiving the best receive beamforming vector v1 at the transmitter side, continue to send out a probing matrix A in order to estimate the transmit beamforming vector. When the best transmit beamforming vector w1 is estimated by the receiver, it is then fed back to the transmitter side through a back channel.

The probing matrix can be selected as an orthogonal matrix, meaning AA'=I, where A' is the complex conjugate of the matrix A, and I is the identity matrix. Given probing matrix A, the received sequence at the receiver using v1, can be represented as:

$$y1 = v1'^{*}H^{*}A$$

wherein H is the channel unknown yet to the receiver. Thus;

$$(y1*A')' = (v1'^{*}H)' = H'^{*}v1$$

which provides the desired transmit beamforming vector w1. Other examples of obtaining w1 are possible.

Figure 7:
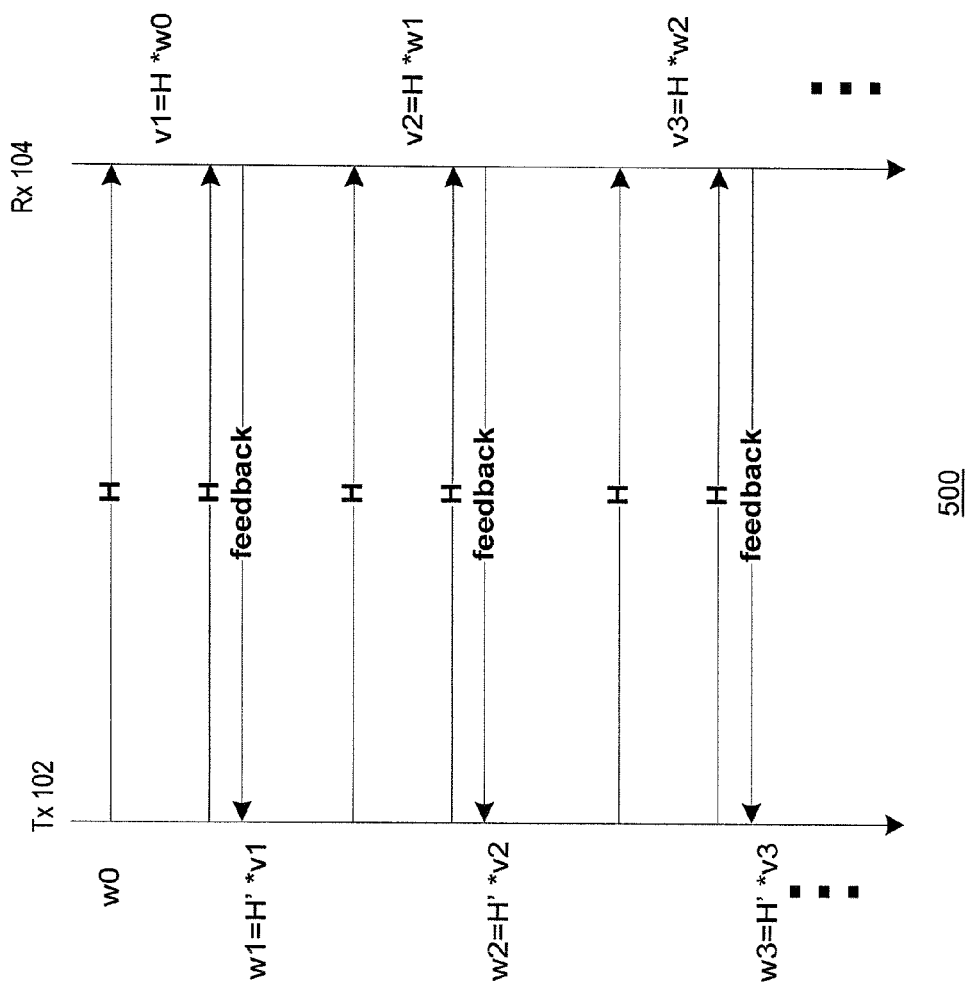
FIG. 7 shows a beam acquisition process for a frequency division duplex (FDD) wireless communication system, according to an embodiment of the invention.

FIG. 7 illustrates a protocol scenario 400 of another power iteration process according to an embodiment of the present invention, progressing from top to bottom of the drawing, for acquisition of the beamforming vectors. The process estimates a transmit beamforming vector in the forward direction with the aid of feedback. The training direction is forward-forward-feedback-forward-forward-feedback.

In particular, as the first step, the transmitter first fixes w0 as the transmit beamforming vector and sends out a forward training sequence for the receiver to estimate the optimal receive beamforming vector (v1) given w0. As a result, v1 is obtained at the receiver side after the forward training.

At the second step, the receiver fixes v1 as the receive beamforming vector; in the mean time, the transmitter sends out a receive training sequence (with different spatial patterns) for the receiver to estimate the optimal transmit beamforming vector (w1) given v1. As a result, w1 is obtained at the receiver side after the receive training.

At the third step, the receiver feeds back the estimated w1 to the transmitter for its use in the future steps.

The above three steps are repeated until convergence.

For every forward training, there is an estimation of beamforming coefficients based on other beamforming coefficients; while for every reverse training, there is estimation of other beamforming coefficients based on certain beamforming coefficients. Examples of estimating the transmit and receive beamforming vectors in FIG. 7 (for FDD systems) will be provided further below.

Figure 8:
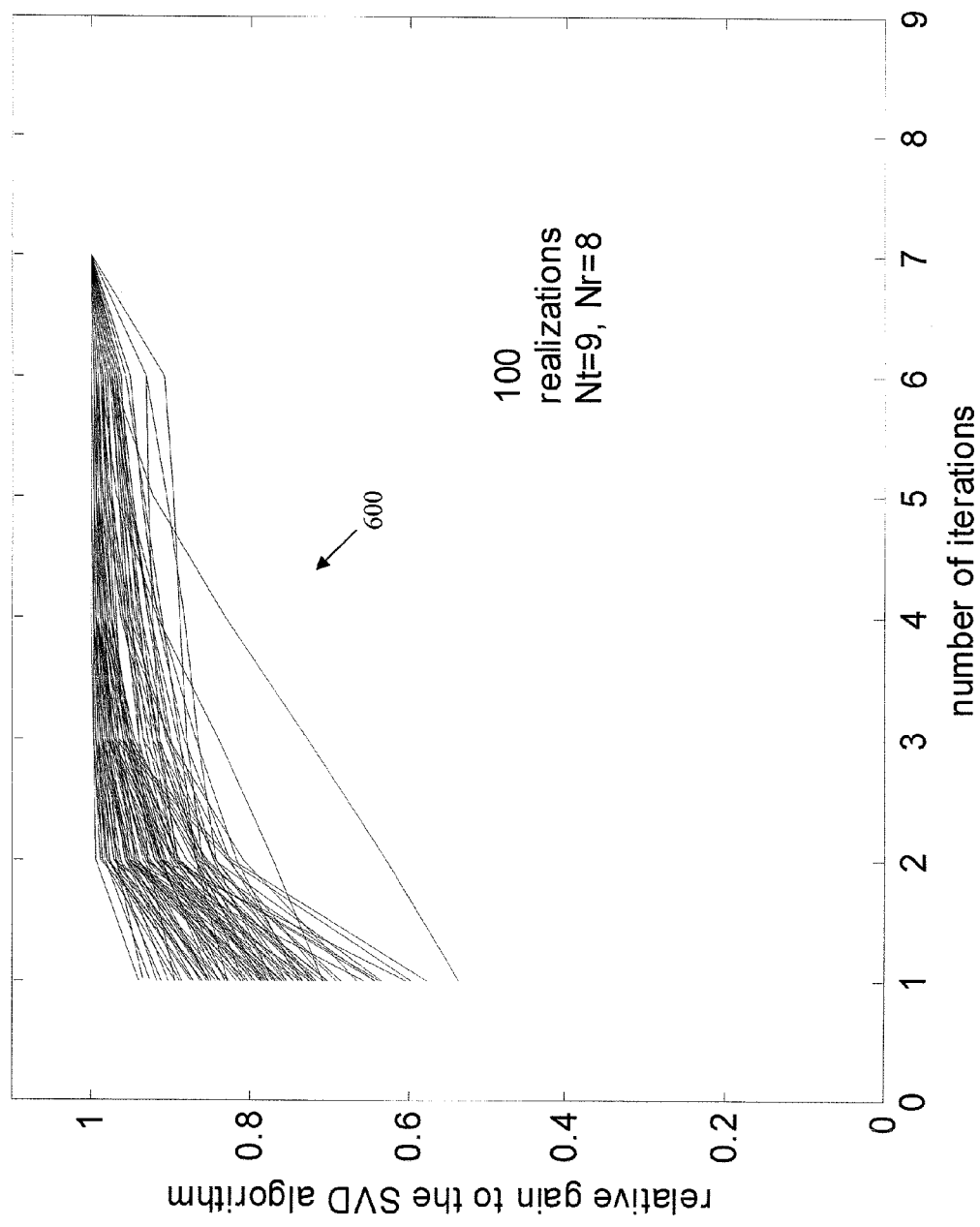
FIG. 8 illustrates an example of convergence behavior of the power iteration process in FIG. 7.

FIG. 8 shows an example of convergence behavior 600 of the above power iteration process for 100 realizations, depicted in terms of number of iterations relative to gain to a process utilizing SVD computation.

Implementation of a preferred process for determining the best signal tap is now described, which reduces the signaling overhead and the computation complexity. One example of the process of determining a best signal tap involves computing a Frobenius norm for all channel taps, and then selecting a tap with the largest Frobenius norm as the best signal tap. Specifically, the Frobenius norm of the channel matrices $H(0), H(1), \ldots, H(L)$ is determined. The Frobenius norm (FrNorm) of the channel matrix $H(0)$ can be expressed as:

$$\text{FrNorm}(H(0)) = \text{sqrt}(\text{trace}(H(0)^{*}H(0)')),$$

wherein sqrt( ) is the square root operation, trace( ) amounts to the sum of all diagonal values of the given matrix parameter, and ( )' represents the matrix conjugate transpose operation.

Estimation of the channel matrix Frobenius norm can be performed using a transfer matrix B at the transmitter side 102, wherein matrix B is of the form Nt-by-Ns. For implementation simplicity, it is desirable to choose the matrix B as an orthogonal matrix, such that BB'=I(Nt). In the case that Ns>=Nt, then the matrix B is known as a semi-orthogonal matrix, where the matrix B is not strictly an orthogonal matrix. Taking the ith tap for example, the received signal matrix Y at the receiver side 104 can be expressed as: Y(i)=H(i)B+n(i). As such, the Frobenius norm of H(0) can be estimated as: sqrt(trace(Y(i)Y(i)')). Note that FrNorm (H(0))=sqrt(trace(H(0)H(0)'))=sqrt(trace(H(0)BB'H(0)')). Thus, only a single matrix multiplication is involved in order to compute the Frobenious norm for each matrix. Further, there is no need to estimate each channel coefficient for the channel matrices, requiring lower signaling overhead.

The Frobenius norm for all channel taps is computed, and the tap with the largest Frobenius norm is selected as the best tap. Besides the Frobenius norm, other indicia for determining the strongest signal power path (i.e., best signal tap or best signal quality tap) in a multipath (multi-tap) wireless channel, can be utilized.

Estimating the Best Transmit Beamforming Vector in TDD Systems

As noted further above, an example process for estimating the best transmit beamforming vector in TDD systems, is now described. Suppose the receiver side 104 sends out a vector v1, and the transmitter side 102 uses a reception matrix A to perform beamforming. The reception matrix A is of the form Ns*Nt, and in general the matrix A is selected such that A'A=I(Nt). As such, the received signal x1 at the transmitter side 102 can be expressed as:

$$x1 = A^{*}H'^{*}v1 + n1.$$

Thus, the best transmit beamforming vector w1 can be estimated as:

$$w1 = A'^* x1 = H'^* v1 30 n2,$$

wherein such an estimation is unbiased. To improve estimation accuracy, the same process can be repeated by spreading by a certain pseudo random sequence.

Estimating the Best Receive Beamforming Vector in TDD Systems

As noted further above, an example process for estimating the best receive beamforming vector in TDD systems is now described. Suppose the transmitter side 102 sends out a vector w1. The receiver side 104 uses a reception matrix B to perform receiver side beamforming. The reception matrix B is typically selected as an Nr*Ns orthogonal matrix, where BB'=I(Nr). The received signal y1 at the receiver side 104 can be expressed as:

$$y1 = B'^* H^* w1 + n3.$$

Thus, the best receive beamforming vector v2 can be estimated as:

$$v2 = B^* y1 = H^* w1 + n4$$

Such estimation is unbiased. To improve estimation accuracy, the same process can be repeated by spreading by a certain pseudo random sequence.

Estimating the Best Transmit Beamforming Vector in FDD Systems

As noted further above, an example process for estimating the best transmit beamforming vector in FDD systems is now described. For FDD systems, it is not possible to estimate the best transmit beamforming vector directly. Instead, the transmitter side may send out a probing matrix of size Nt*Ns, where Nt is the number of transmit antennas and Ns is the number of probing vectors in the probing matrix. The probing matrix is denoted as matrix A. Generally the matrix A is selected such that AA'=I(Nt), and Ns>=Nt. The probing matrix A is known as a semi-orthogonal matrix. Suppose the fixed receive beamforming is v at the receiver side. Then, over an Ns time slot when the transmitter sends out Ns columns of Ns, the received samples r over this Ns time slot can be expressed as:

$$r = v'^* H^* A + n1$$

wherein r is a 1*Ns vector. Then, the best transmit beamforming vector w can be expressed as:

$$w = (r^* A')' = (v'^* H^* A^* A')' + n2 = H'^* v + n2.$$

It can be readily seen that y is an unbiased estimate of the best transmit beamforming vector, with estimation noise n2. To improve estimation accuracy, the same process can be repeated by spreading by a certain pseudo random sequence.

Estimating the Best Receive Beamforming Vector in FDD Systems

As noted further above, an example process for estimating the best receive beamforming vector in FDD systems is now described. Suppose the fixed transmit beamforming is w at the transmitter side. Suppose the reception matrix B is the Ns*Nr reception matrix where B'B=I(Nr). Then the received signal z at the receiver side can be expressed as:

$$z = B'^* H^* w + n3.$$

and the receive beamforming vector can be estimated as:

$$v = B'^* z = H^* w + n4$$

It can be readily seen that v is an unbiased estimate of the best receive beamforming vector, with estimation noise n4. To improve the estimation accuracy, the same process can be repeated by spreading by a certain pseudo random sequence.

Each of the transfer matrix A and reception matrix B can be selected as an orthogonal matrix, such as Hadamard matrix, Fourier matrix, complex Hadamard matrix, identity matrix, or other orthogonal matrices.

Figure 9:
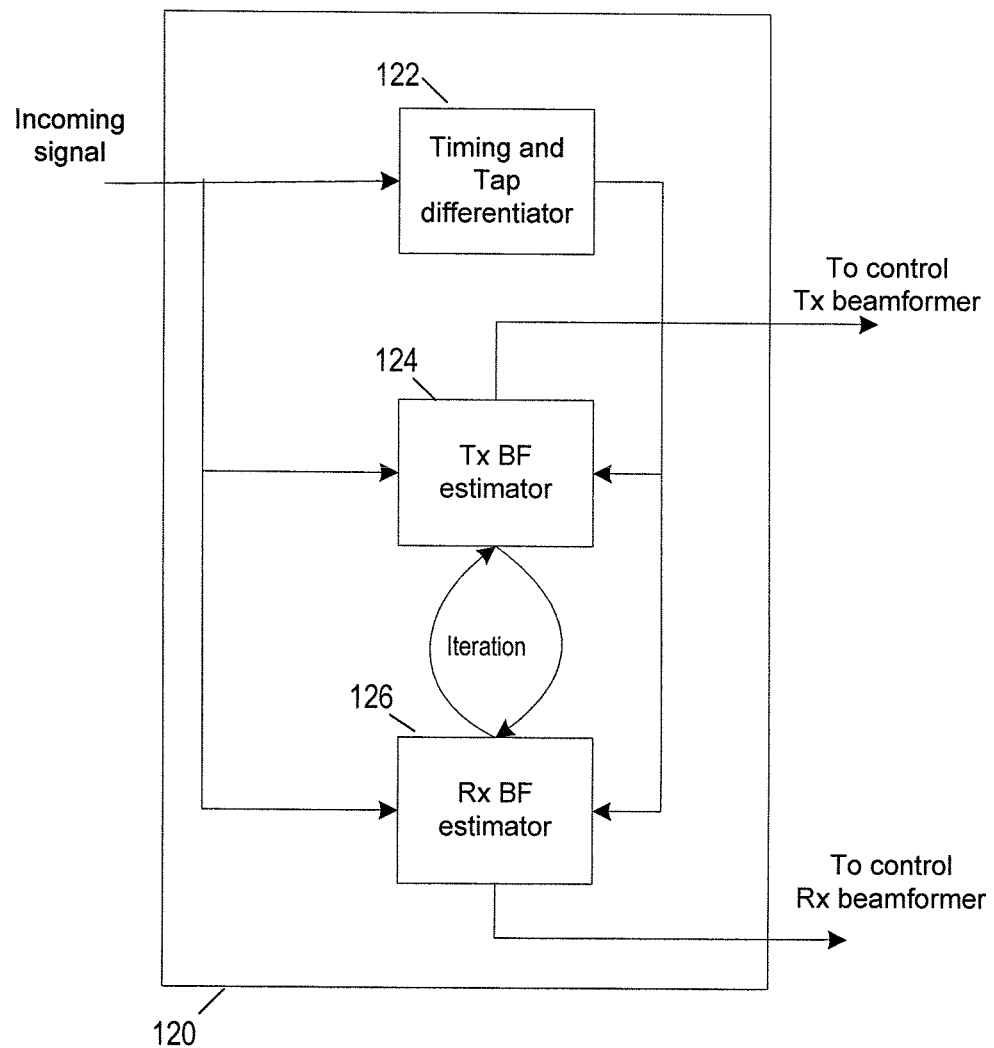
FIG. 9 shows an example implementation of the power iteration process for acquisition of transmit and receive analog beamforming vectors, according to the present invention.

FIG. 9 shows an example implementation of the power iteration process for acquisition of transmit and receive analog beamforming vectors by the BF controller 120 (FIG. 1), according to the present invention. In this example, the BF controller 120 includes a timing and tap differentiator 122, a Tx BF estimator 124 and a Rx BF estimator 126. The input signal to the differentiator 122 and the estimator 124 provides vector values including a received training sequence. For example, when probing matrix A is used, the received sequence corresponding to matrix A is such a training sequence. The training sequence y basically provides the response of the unknown wireless channel to a known input at the transmitter side (e.g., A the probing matrix). Thus, by combining y and A, the characteristics of the channel can be determined.

The timing and tap differentiator 122 establishes timing and determines which tap has best signal quality, as described above. The Tx BF estimator 124 and the Rx BF estimator 126 operate in an iterative manner for beamforming vector acquisition on the best signal tap. The Tx BF estimator 124 estimates the Tx beamforming vector as discussed above, and controls the Tx beamformer 108, accordingly (FIG. 1). The Rx BF estimator 126 estimates the Rx BF vector as discussed above, and controls the RX beamformer 110 (FIG. 1), accordingly. An example operation scenario involves:

1. Activating the TX BF estimator 124 to improve estimation of a Tx BF vector, wherein an estimated Tx BF vector is passed to the Rx BF estimator 126. Then, activating the Tx BF estimator 124 multiplies the input signal (the received r above) by a matrix (matrix A). The product is a vector and is an improved estimation of the Tx BF vector.
2. Activate Rx BF estimator 126 to improve estimation of a Rx BF vector, wherein an estimated Rx BF vector is pass the output to the Tx BF estimator 124. Then, activating the Rx BF estimator 126 multiplies the input signal (the received z above) by another matrix (matrix B). The product is another vector and is an improved estimation of the Rx BF vector.
3. Repeat steps 1 and 2 until the vectors converge.

The present invention is applicable to mm-wave and other wireless and non-wireless communication channels.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:
1. A method of analog beamforming in a communication system, comprising:
 constructing analog beamforming coefficients for beamforming communication on communication channels, including:

selecting a signal tap from a multi-tap channel for beamforming communication, wherein the selected signal tap has a higher signal quality relative to other signals taps; and acquiring beamforming coefficients for the selected signal tap by power iteration comprising selecting the signal tap in a multi-tap wireless channel without a search for an optimum steering vector across the multi-tap wireless channel based on raising a ratio of diagonal components of a channel matrix to a power of an iteration index that increases for each successive power iteration.

2. The method of claim 1 further including utilizing one channel matrix on the selected tap for determining the coefficients.

3. The method of claim 1, wherein selecting a signal tap further includes computing a performance metric for all channel taps and selecting a signal tap with the highest performance metric.

4. The method of claim 3 selecting a signal tap further includes selecting a signal tap with the largest Frobenius norms.

5. The method of claim 1, wherein acquiring beamforming coefficients includes determining beamforming transmit coefficients based on an iterative beam acquisition process, wherein each iteration includes estimating analog transmit beamforming coefficients based on receive beamforming coefficients obtained in a most recent iteration, until the beamforming coefficients converge.

6. The method of claim 1, wherein acquiring beamforming coefficients includes determining beamforming receive coefficients based on an iterative beam acquisition process, wherein each iteration includes estimating analog receive beamforming coefficients based on transmit beamforming coefficients obtained in a most recent iteration, until the beamforming coefficients converge.

7. The method of claim 1, wherein acquiring beamforming coefficients further includes estimating a transmit beamforming coefficient vector in a reverse direction without explicit feedback using a training sequence.

8. The method of claim 1, wherein acquiring beamforming coefficients further includes estimating a transmit beamforming coefficient vector in a forward direction based on feedback using a training sequence.

9. The method of claim 1, wherein acquiring beamforming coefficients further includes estimating a receive beamforming coefficient vector in a forward direction without explicit feedback using a training sequence.

10. The method of claim 1, wherein acquiring beamforming coefficients further includes estimating beamforming coefficients by power iterations based on channel reciprocity.

11. The method of claim 1, wherein estimating beamforming coefficients by power iterations includes:
(a) selecting initial transmit beamforming coefficients;
(b) estimating receive beamforming coefficients based on the transmit beamforming coefficients;
(c) estimating transmit beamforming coefficients based on the receive beamforming coefficients;
(d) repeating step (b) and (c) until the iteration converges.

12. The method of claim 1, wherein estimating beamforming coefficients by power iterations includes:
(a) selecting initial receive beamforming coefficients;
(b) selecting transmit beamforming coefficients based on the receive beamforming coefficients to maximize gain of equivalent multiple-input-single-output (MISO) channel;
(c) selecting receive beamforming coefficients based on the transmit beamforming coefficients to maximize gain of equivalent single-input-multiple-output (SIMO) channel;
(d) repeating step (b) and (c) until the achieved gain converges.

13. The method of claim 1, wherein the channel comprises a wireless channel.

14. The method of claim 1, wherein the channel comprises a non-wireless channel.

15. A system for analog beamforming on wireless channels, comprising:
a tap differentiator configured for selecting a signal tap from a multi-tap wireless channel for beamforming communication, wherein the selected signal tap has a higher signal quality relative to other signals taps;
a beamforming controller configured for acquiring analog beamforming coefficients for the selected signal tap by power iteration comprising selecting the signal tap in a multi-tap wireless channel without a search for an optimum steering vector across the multi-tap wireless channel based on raising a ratio of diagonal components of a multi-tap wireless channel matrix to a power of an iteration index that increases for each successive power iteration; and
a beamformer configured for applying the beamforming coefficients to signals for transmission over the selected tap.

16. The system of claim 15, wherein the tap differentiator comprises a digital tap differentiator operating in the digital domain, the beamforming controller comprises a digital tap differentiator operating in the digital domain, and the beamformer comprises an analog beamformer operating in the analog domain.

17. The system of claim 15, wherein the tap differentiator comprises a digital tap differentiator, the beamforming controller comprises a digital tap differentiator and the beamformer comprises a digital beamformer, all operating in the digital domain.

18. The system of claim 15, wherein the beamforming controller is further configured for utilizing one channel matrix on the selected tap for determining the coefficients.

19. The system of claim 15, wherein the tap differentiator is configured for selecting a signal tap by computing a Frobenius norm for all channel taps, and selecting a signal tap with the largest Frobenius norms.

20. The system of claim 15, wherein the beamforming controller is configured for determining beamforming transmit coefficients based on an iterative beam acquisition process, wherein each iteration includes estimating analog transmit beamforming coefficients based on receive beamforming coefficients obtained in a most recent iteration, until the beamforming coefficients converge.

21. The system of claim 15, wherein the beamforming controller is configured for determining beamforming receive coefficients based on an iterative beam acquisition process, wherein each iteration includes estimating analog receive beamforming coefficients based on transmit beamforming coefficients obtained in a most recent iteration, until the beamforming coefficients converge.

22. The system of claim 15, wherein the beamforming controller is configured for estimating beamforming coefficients by power iterations including:
(a) selecting initial transmit beamforming coefficients;
(b) estimating receive beamforming coefficients based on the transmit beamforming coefficients;

(c) estimating transmit beamforming coefficients based on the receive beamforming coefficients;
(d) repeating step (b) and (c) until the iteration converges.

23. The system of claim 15, wherein the beamforming controller is configured for estimating beamforming coefficients by power iterations including:
(a) selecting initial receive beamforming coefficients;
(b) selecting transmit beamforming coefficients based on the receive beamforming coefficients to maximize gain of equivalent multiple-input-single-output (MISO) channel;
(c) selecting receive beamforming coefficients based on the transmit beamforming coefficients to maximize gain of equivalent single-input-multiple-output (SIMO) channel; and
(d) repeating step (b) and (c) until the achieved gain converges.

24. The system of claim 15 wherein the beamforming coefficients include transmit beamforming coefficients and receiver beamforming coefficients, the system further comprising: a wireless transmitter configured for transmitting signals on the selected tap by beamforming based on the beamforming coefficients; and a wireless receiver configured for receiving signals on the selected tap by beamforming based on the beamforming coefficients.

25. The system of claim 15 further including a transmitter and a receiver, the transmitter configured for acquiring beamforming coefficients by estimating a transmit beamforming coefficient vector in a reverse direction from a receiver without explicit feedback using a training sequence.

26. The system of claim 15 further including a transmitter and a receiver, the transmitter configured for acquiring beamforming coefficients by estimating a transmit beamforming coefficient vector in a forward direction from the transmitter based on feedback using a training sequence.

27. An analog beamforming control module for wireless communication, comprising:
a tap differentiator configured for selecting a signal tap from a multi-tap wireless channel for beamforming communication, wherein the selected signal tap has a higher signal quality relative to other signals taps; and
a beamforming controller configured for acquiring analog beamforming coefficients for the selected signal tap by power iteration comprising selecting the signal tap in a multi-tap wireless channel without a search for an optimum steering vector across the multi-tap wireless channel based on raising a ratio of diagonal components of a multi-tap wireless channel matrix to a power of an iteration index that increases for each successive power iteration.

28. The control module of claim 27, wherein the beamforming controller is further configured for utilizing one channel matrix on the selected tap for determining the coefficients.

29. The control module of claim 27, wherein the tap differentiator is configured for selecting a signal tap by computing a Frobenius norm for all channel taps, and selecting a signal tap with the largest Frobenius norms.

30. The method of claim 1, wherein selecting the signal tap further comprises estimating Nt*Nr*(L+1) channel coefficients and performing L+1 singular value decompositions, wherein Nt is a number of transmit antennas, Nr is a number of receive antennas and L+1 is a maximum number of taps for all transmit/receive antenna pairs.

31. The method of claim 1, wherein beamforming vectors are determined using one channel matrix on a signal tap representing a strongest signal power path in the multi-tap wireless channel for reducing signaling overhead.

32. The method of claim 1, wherein selecting the ratio of diagonal components is based on:

$$\lim_{n\to\infty} \frac{s(2)^{2n}}{s(1)^{2n}} = 0, \ldots \lim_{n\to\infty} \frac{s(m)^{2n}}{s(1)^{2n}} = 0,$$

where n is the iteration index, m = a minimum Nt, Nr, where Nt is a number of transmit antennas and Nr is a number of receive antennas.

33. The method of claim 32, wherein $s(1) > S(2) > \ldots s(m)$.

* * * * *